United States Patent
Krueger et al.

(10) Patent No.: US 12,097,741 B2
(45) Date of Patent: Sep. 24, 2024

(54) STABILIZER ASSEMBLY FOR A TWO-TRACK VEHICLE

(71) Applicants: BAYERISCHE MOTOREN WERKE AKTIENGESELLSCHAFT, Munich (DE); MUHR UND BENDER KG, Attendorn (DE)

(72) Inventors: Robert Krueger, Puchheim (DE); Daniel Schröder, Olpe-Dahl (DE); Thomas Schrüllkamp, Olpe (DE); Alexander Stichling, Erfurt (DE); Simon Hofrichter, Lennestadt (DE)

(73) Assignees: BAYERISCHE MOTOREN WERKE AKTIENGESELLSCHAFT, Munich (DE); MUHR UND BENDER KG, Attendorn (DE)

( * ) Notice: Subject to any disclaimer, the term of this patent is extended or adjusted under 35 U.S.C. 154(b) by 84 days.

(21) Appl. No.: 17/607,358

(22) PCT Filed: Apr. 28, 2020

(86) PCT No.: PCT/EP2020/061765
§ 371 (c)(1),
(2) Date: Oct. 28, 2021

(87) PCT Pub. No.: WO2020/225029
PCT Pub. Date: Nov. 12, 2020

(65) Prior Publication Data
US 2022/0212515 A1    Jul. 7, 2022

(30) Foreign Application Priority Data
May 3, 2019    (DE) ..................... 10 2019 111 488.8

(51) Int. Cl.
*B60G 15/06*    (2006.01)
*B60G 17/02*    (2006.01)
(Continued)

(52) U.S. Cl.
CPC ......... *B60G 21/0558* (2013.01); *B60G 15/06* (2013.01); *B60G 17/02* (2013.01);
(Continued)

(58) Field of Classification Search
CPC ........ B60G 15/06; B60G 17/02; B60G 17/08; B60G 21/0553; B60G 21/0558;
(Continued)

(56) References Cited

U.S. PATENT DOCUMENTS 4,796,911 A    1/1989    Kuroki et al.
4,962,643 A    10/1990    Panten et al.
(Continued)

FOREIGN PATENT DOCUMENTS

CN    101146689 A    3/2008
DE    102005013769 A1 *  10/2006  ......... B60G 21/0556
(Continued)

OTHER PUBLICATIONS

Description translation for DE 102009/029802 from Espacenet (Year: 2010).*
(Continued)

*Primary Examiner* — Jason D Shanske
*Assistant Examiner* — Daniel M. Keck
(74) *Attorney, Agent, or Firm* — Hamilton, Brook, Smith & Reynolds, P.C.

(57) ABSTRACT

The invention relates to a stabilizer assembly of a two-track vehicle for stabilizing a rolling movement, the stabilizer assembly being operable on at least two different spring characteristics, comprising a first and a second stabilizer half, each coupled to a wheel of the vehicle, wherein the first and the second stabilizer halves are coupled such that they can rotate relative to each other about their longitudinal axis by means of a spring element, whereby the stabilizer is operable with a first spring characteristic, and wherein the (Continued)

first and the second stabilizer halves can be hydraulically coupled such that they can rotate relative to each other about their longitudinal axis by means of a hydraulic actuator, whereby the stabilizer is operable using at least one second spring characteristic. The actuator comprises at least two work chambers which are filled with a hydraulic medium and coupled to each other by a fluid-conducting connection, and the actuator comprises a transmission unit which is designed such that a rotational movement of the stabilizer halves can be converted into a translational movement of an intermediate element arranged between the two work chambers, and a volume flow of the hydraulic medium from the one work chamber into the other work chamber can thus be produced.

8 Claims, 3 Drawing Sheets

(51) Int. Cl.
*B60G 17/08* (2006.01)
*B60G 21/055* (2006.01)

(52) U.S. Cl.
CPC ........ *B60G 17/08* (2013.01); *B60G 2202/135* (2013.01); *B60G 2202/322* (2013.01); *B60G 2202/413* (2013.01); *B60G 2206/427* (2013.01); *B60G 2400/91* (2013.01); *B60G 2500/11* (2013.01); *B60G 2500/20* (2013.01)

(58) Field of Classification Search
CPC ........ B60G 2202/135; B60G 2202/322; B60G 2202/413; B60G 2202/441; B60G 2204/419; B60G 2206/427; B60G 2400/91; B60G 2500/11; B60G 2500/20; F16F 1/46; F16F 9/18; F16F 9/46; F16F 9/466; F16F 2232/04; F16F 2236/08; F16F 2238/024; F16F 2238/026
See application file for complete search history.

(56) References Cited

U.S. PATENT DOCUMENTS

| | | | |
|---|---|---|---|
| 7,287,759 | B2 | 10/2007 | Uchiyama et al. |
| 2005/0051396 | A1 | 3/2005 | Kawakami |
| 2008/0191430 | A1 | 8/2008 | Grannemann et al. |
| 2009/0058020 | A1* | 3/2009 | Ersoy ............... B60G 21/0556 280/5.511 |
| 2020/0198435 | A1* | 6/2020 | Dhanraj ............ B60G 21/0558 |

FOREIGN PATENT DOCUMENTS

| | | |
|---|---|---|
| DE | 102005043176 A1 | 3/2007 |
| DE | 102006051682 A1 | 2/2008 |
| DE | 112006001101 T5 | 5/2008 |
| DE | 102008008017 A1 | 8/2009 |
| DE | 102009029802 A1 | 12/2010 |
| DE | 102009034849 A1 | 2/2011 |
| DE | 20 2015 101123 U1 | 3/2015 |
| DE | 102014018732 A1 | 6/2015 |
| DE | 102016215098 A1 | 2/2017 |
| DE | 102016104701 A1 * | 9/2017 |
| DE | 102017118044 A1 | 2/2018 |
| DE | 102017215526 B3 | 3/2019 |
| EP | 1093942 A1 * | 4/2001 ......... B60G 21/0553 |
| GB | 2318771 A | 5/1998 |
| JP | 59-072107 U | 5/1984 |
| JP | 60-060024 A | 4/1985 |
| JP | 61-190708 A | 8/1986 |
| JP | 62-221909 A | 9/1987 |
| JP | 63-057309 A | 3/1988 |
| JP | 03-227714 A | 10/1991 |
| JP | 05-319063 A | 12/1993 |
| JP | 2004-122944 A | 4/2004 |
| JP | 2005-082023 A | 3/2005 |

OTHER PUBLICATIONS

Description translation for DE 202015/101123 from Espacenet (Year: 2015).*
Description Translation for DE 102016104701 from Espacenet (Year: 2016).*
International Search Report for Int'l Application No. PCT/EP2020/061765, titled: Stabilizer Assembly for a Two-Track Vehicle, Date Completed: Jul. 23, 2020 (With English Translation).

* cited by examiner

STABILIZER ASSEMBLY FOR A TWO-TRACK VEHICLE

This application is the U.S. National Stage of International Application No. PCT/EP2020/061765, filed on Apr. 28, 2020, which designates the U.S., published in German, and claims priority under 35 U.S.C. § 119 or 365(c) to German Application No. DE 10 2019 111 488.8, filed on May 3, 2019. The entire teachings of the above applications are incorporated herein by reference.

The invention relates to a stabilizer assembly of a two-track vehicle according to the preamble of claim 1 as well as to a method for operating such a stabilizer assembly according to the independent claim 7. Regarding prior art, reference is made to DE 10 2006 051 682 A1 and DE 10 2014 018 732 A1, for instance.

Different road excitations acting on a vehicle wheel, for example in the case of uneven road conditions or when a two-track vehicle is cornering, can result in undesirable rolling and/or pitching movements of the vehicle. This can have a negative impact on driving safety, driving dynamics as well as comfort and may change these. To reduce or attenuate these rolling and/or pitching movements, it is known from prior art to install so-called stabilizers, i.e. special suspension systems, on one or both axles of the vehicle. A distinction is here made between three different types of stabilizers. A so-called passive stabilizer works according to the torsion bar principle. A one-piece torsion bar is arranged parallel to the vehicle axle structure and attached at both ends to a wheel suspension. Different vertical movements of the wheels are compensated for by elastic deformation or rotation of this torsion bar stabilizer. However, the passive stabilizer can store the absorbed kinetic energy only temporarily and then releases it again. The counterforces absorbed by the system cannot be controlled here, but result from the relative movements that occur depending on the driving situation. Passive stabilizers are thus designed for a predetermined spring rate in terms of their dimensions and material properties, so that they are able to absorb torsional forces only in a certain magnitude and may apply corresponding counterforces. This creates a conflict between comfort, i.e. a desired soft suspension, and driving dynamics as well as safety, i.e. a desired hard suspension. For this reason, passive stabilizers are basically suitable only to a limited extent, especially for vehicles intended for both on-road and off-road use.

In addition to the above-mentioned passive stabilizers, there are also so-called active stabilizers, which are usually designed in two parts. One end of each stabilizer half is connected to a vehicle wheel or wheel suspension. The two stabilizer halves are then usually connected to each other by a suitable actuator, which actively rotates the two stabilizer halves relative to each other by means of a suitable control system. In contrast to passive stabilizers, active stabilizers can introduce forces and torques between the vehicle body and the chassis as required and generate desired travel distances. These forces are then no longer the result of body movements but are functions of arbitrary variables such as lateral acceleration or rolling angle. The rolling angle can be reduced and the vehicle body can be brought into a horizontal position by applying specific counter-rolling torques and actively rotating the stabilizer, for example when cornering. Decoupling when the vehicle is traveling straight ahead reduces copying effects, since no vertical moments are applied to the vehicle axle, which allows to significantly increase the driving comfort. Accordingly, the aforementioned conflict between comfort and driving dynamics can be solved by active stabilizers. However, such active systems are dependent on external energy (pumping device, motor, etc.), which causes additional costs, weight and installation space problems.

In addition, so-called semi-active stabilizers are also known from prior art, in which no pumping device is provided and the work chambers of one or more semi-active actuators, for example swivel motors, are connected to one another via actively controlled valves. Here, the volume flow between the work chambers is controlled via the valves. Since a movement of the actuator, for example of the rotor of a swivel motor, is required in order to generate a volume flow between the work chambers, which in turn builds up a force in the chassis system to counteract the unwanted vehicle movements, the control of the semi-active chassis system takes place in response to the unwanted vehicle movements. Thus, only energy to control the valves is needed. In contrast to an active stabilizer, however, no forces are actively applied in a semi-active stabilizer; instead, a cushioning effect is generated depending on the valve position (i.e. by switching over between two characteristic curves) and exclusively in response to the rolling and/or pitching movements of the vehicle. DE 10 2016 215 098 A1 describes, for example, a switchable stabilizer assembly of a vehicle, in particular for rolling stabilization. Said stabilizer assembly comprises a first and a second stabilizer half, each coupled to a wheel of the vehicle, wherein the first and the second stabilizer halves are coupled such that they can rotate relative to each other about their longitudinal axis by means of a hydraulic semi-active actuator. Here, the actuator has at least two work chambers filled with a hydraulic medium and comprises at least one fluid-conducting connection between the at least two work chambers, the passage cross-section of which is variable. The work chambers of the actuator themselves are not elastically deformable. Instead, a spring element is arranged in the at least two work chambers of the actuator and/or in at least two further work chambers of the actuator, which spring element is supported between a rotor and a stator of the actuator.

However, a disadvantage of this prior art is that the volume flow of the hydraulic medium is strongly limited by the spring travel of the spring element. Furthermore, it is difficult to ensure a low-cost and low-effort sealing system of the stabilizer assembly.

DE 10 2014 018 732 A1 shows a stabilizer of a vehicle in which hydraulic chambers are fluidically coupled to one another by means of a frequency-selective high-pass valve.

It is the object of the present invention to provide a vehicle stabilizer that is optimized with respect to an optimized and less complicated sealing system as well as in terms of the volume flow of the hydraulic medium.

The solution of the object is achieved by a stabilizer assembly of a two-track vehicle comprising the features of claim 1 as well as a method of operating such a stabilizer assembly according to the independent claim 7. Advantageous designs and further developments are subject-matter of the dependent claims.

A stabilizer assembly of a vehicle, in particular for rolling stabilization, is proposed which is operable on or can be switched between at least two spring characteristics.

The stabilizer assembly comprises a first and a second stabilizer half each coupled to a wheel of the vehicle.

The stabilizer halves are each coupled such that they can rotate relative to each other about their longitudinal axis by means of a spring element. This coupling to the spring element results in a first spring characteristic on which the stabilizer assembly is operable. In this context, the spring rate or the first spring characteristic, respectively, is adjustable by the spring stiffness of the spring element.

The spring element is preferably designed as a torsion bar spring connecting the two stabilizer halves. This torsion bar spring can be designed as a rubber rod, for example. Thus, the torsion bar spring is used as a torsion spring capable of cushioning or damping torsional movements of the stabilizer half. Alternatively, it is possible that the spring element is a torsion spring which is connected to at least one of the stabilizer halves, and the two stabilizer halves are coupled to each other via a rod element. This rod element is then not designed as a torsion spring, but as a (substantially) non-resilient rigid rod. In this case, the torsion spring may be, for example, a spiral spring arranged on one of the two stabilizer halves, which is arranged in such a way that its spring axis is at least approximately parallel to the axis of rotation of the wheels. In this way, the spiral spring is able to dampen or cushion the rotational movement of the two stabilizer halves relative to each other.

Furthermore, the stabilizer assembly comprises a hydraulic (e.g. semi-active) actuator that is capable of hydraulically coupling the two stabilizer halves such that they can rotate relative to each other about their longitudinal axis.

Here, the actuator comprises at least two work chambers which are filled with a hydraulic medium and coupled to each other by a fluid-conducting connection. When the actuator is activated, there is a fluid flow of the hydraulic medium between the work chambers. The volume flow of the hydraulic medium through the fluid-conducting connection a damping effect can be achieved. The hydraulic actuator is active when the fluid-conducting connection between the two work chambers is established.

If the hydraulic actuator is activated, the stabilizer assembly is operated on at least one second spring characteristic. Depending on whether a spring element or a hydraulic actuator achieves the cushioning effect or damping, the spring characteristic can also be referred to as a damper characteristic.

The hydraulic actuator is preferably not an electrically or mechanically driven motor, but an installation that does not require any external energy (except possibly for setting or opening an actuating element) and still causes a purely passive change in the system.

In certain situations, a higher level of damping or cushioning the rolling movements is required, in which the damping or cushioning effect brought about by the spring element is no longer sufficient. In these situations it will be preferred that the fluid-conducting connection is established, i.e. the hydraulic actuator is activated, and that the stabilizer assembly is operated with at least the second spring characteristic (or even several further spring characteristics).

The term "semi-active" (which represents the preferred design of the actuator) means in the sense of the invention that an external energy supply is necessary only for the alteration of the passage cross-section or for the preferred active opening or closing of said fluid-conducting connection between the work chambers, respectively. In contrast to the active stabilizer already described above, no external energy supply is required to introduce the rotational or damping force.

It is further provided that the actuator comprises a transmission unit which is designed such that a rotational movement of the stabilizer halves can be converted into a translational movement of an intermediate element arranged between the two work chambers, thus allowing a volume flow of the hydraulic medium to be generated between the two work chambers by the fluid-conducting connection.

This transmission unit comprises in particular a so-called rotation-translation converter. The latter is coupled to the stabilizer halves preferably by means of an interlocking fit.

If the actuator is activated (i.e. if there is a hydraulic flow through the fluid-conducting connection of the two work chambers), the rotational movement of the stabilizer halves can thus be converted via said transmission unit, in particular said rotation-translation converter, into a translational movement of the intermediate element arranged between the two work chambers or separating the two work chambers from each other.

If the actuator is activated, the volume flow of the hydraulic medium can be adjusted via the pitch of the transmission unit or the gear teeth of the rotation-translation converter. An exemplary design of such a stabilizer assembly including such a transmission unit or rotation-translation converter can be taken from the Figures and the associated description of the Figures.

In contrast to prior art in which the volume flow of the hydraulic medium is limited by the spring travel of the spring elements, this invention can ensure a significantly more variable and less limited volume flow of the hydraulic medium and thus an optimized damping force.

In a preferred embodiment of the invention, it is provided that the fluid-conducting connection (or another fluid-conducting connection of the two work chambers) comprises a so-called frequency-selective valve. In such a case, the fluid-conducting connection does not necessarily have to comprise an actively controllable actuating element (or valve) for actively opening and closing the fluid-conducting connection. This is because the frequency-selective valve alone allows a frequency-dependent damping of the oscillations (even without external control or energy supply). Thus, in case of using a frequency-selective valve (without an actively controllable actuating element), the actuator represents a purely passive design, which does not require any external energy supply for activation and operation. The fluid-conducting connection is therefore open or closed or partially open only depending on the oscillation frequency of the stabilizer halves.

Such a frequency-selective actuating element can provide a frequency-selective damping effect, with the possibility of altering the passage cross-section of the fluid-conducting connection depending on the oscillation frequency of the stabilizer assembly or of the two stabilizer halves by the rolling movement.

A frequency selective valve can detect the oscillation frequencies in the hydraulic medium and automatically open or close in certain frequency ranges. For this purpose, the damping force, provided by the frequency-selective valve of the fluid chambers, is preferably designed with regard to the movement frequency of the vehicle or the movement frequency of the stabilizer movement such that a low damping force is achieved at higher frequencies (in particular frequencies in the range greater than 2-5 Hz) and a large damping force is achieved at lower frequencies (in particular at frequencies in the range less than 2-5 Hz).

Preferably, the fluid-conducting connection between the work chambers is designed in the form of a pipeline or channel.

If the actuator is activated, the fluid-conducting connection between the work chambers is preferably open.

In a further advantageous embodiment of the invention and as an alternative or in addition to the frequency-selective valve, an actuating element (for example a valve) associated to the actuator and altering the passage cross-section of the connection is coupled to a control unit. In a particularly preferred design of the invention, said control unit is designed as a open/closed-loop control unit.

Here, it is preferably provided that the actuator is activated by switching the actuating element in such a way that the fluid-conducting connection between the work chambers is (at least partially) established. The actuator is deactivated when the fluid-conducting connection between the work chambers is interrupted, i.e. if the preferred actuating element is switched such that it interrupts the fluid-conducting connection. In contrast to the above-mentioned preferred frequency-selective valve, the preferred actuating element requires an external energy supply or energization to be switched to the various positions (e.g. the open and the closed position). In case of using such an actuating element, the actuator is no longer only passive, but is designed in the form of a semi-active actuator already described above.

The actuating element can completely disconnect the fluid-conducting connection, completely open it or only reduce the passage cross-section thereof without causing a complete disconnection or interruption of the connection. Depending on the speed of the hydraulic medium flowing into the fluid-conducting connection during a translational movement of the intermediate element, a different throttling effect and thus at the same time an additional damping effect can be achieved by only partially closing the connection.

The alteration of the passage cross-section, for example by means of an actuating element, is preferably achieved by an active control here. Apart from this active control (preferably by said control unit), no further external energy supply is required to perform the preferred switchable stability function. In the unpowered state, the actuating element is preferably in a closed state and the actuator is deactivated. At that moment, there is no fluid-conducting connection between the work chambers, and the hydraulic actuator and thus the hydraulic damping is deactivated.

As already known, it is preferred that an actuating element, in particular a valve, is used to establish the fluid-conducting connection of the work chambers. The actuating element can be arranged either alternatively or additionally to the preferred frequency-selective valve already mentioned.

A method for operating a stabilizer assembly designed according to any of claims 1 to 6 is also proposed. In a first step, a rolling movement of the vehicle is detected, for example by suitable sensors in the vehicle.

Subsequently, a so-called damper default setting is calculated or determined. A damper default setting is the specification in which spring characteristic the stabilizer assembly is to be operated in the respective situation (i.e. at which time). For example, the damper default setting can mean either the operation of the stabilizer assembly on the first spring characteristic (i.e. with interrupted fluid-conducting connection and thus with deactivated actuator) or in the second spring characteristic (i.e. with an established fluid-conducting connection and thus with activated actuator). The first damper default setting means here that the stabilizer assembly is to be operated on the second spring characteristic. The second damper default setting means that the stabilizer assembly is to be operated on the first spring characteristic.

This damper default setting is preferably set or calculated depending on certain boundary conditions. The actuator is thus activated or deactivated preferably depending on these certain boundary conditions. Stated in other words, the fluid-conducting connection is established or interrupted depending on said boundary conditions or depending on a certain driving mode. Thus, it is preferably provided that said actuating element (which preferably represents a valve) is open, closed or partially closed depending on these certain boundary conditions.

A possible boundary condition may be, for example, the lateral acceleration of the vehicle, a height level of the wheel, a steering angle, a rolling angle, an information in the navigation system and much more. Furthermore, in particular a driving mode adapted by the vehicle driver or automatically adapting to the driving situation represents such a boundary condition.

Upon detecting a curvy drive on the basis of a constantly changing steering angle, for instance, the control unit can cause the second damper default setting to be set and the fluid-conducting connection to be interrupted (and thus the actuator to be deactivated). Accordingly, there is no fluid flow between the two work chambers. Furthermore, it is possible that the vehicle driver himself activates a so-called sport mode by means of an actuating unit and thus desires a more accurate road feedback and a more realistic driving experience. Hence, if it is detected that such a driving mode like a sport mode (or the like) is activated, it is preferably provided that the second damper default setting is set, the actuator is deactivated and the stabilizer assembly is operated on the first spring characteristic which is defined by the spring element.

If the fluid-conducting connection between the work chambers is blocked, for example by a closing unit or a closed valve, the two work chambers can no longer communicate freely by means of the hydraulic medium, and there is no fluid flow between the work chambers and the two stabilizer halves are maximally coupled. The stabilizer assembly is operated on the first spring characteristic determined by the spring element. In case a torsion bar spring is used as the spring element, a passive stabilizer is created. The latter has a load-displacement characteristic of a conventional, one-piece stabilizer according to the torsion bar principle. In this maximally coupled state, the stabilizer shows the hardest or stiffest effect.

If, on the other hand, it can be seen from the information from the navigation system that the vehicle is operated predominantly so as to travel straight ahead for some time (e.g., on a long highway trip), the first damper default setting can be set and the fluid-conducting connection can be established, thus activating the actuator.

Also in such a case it is possible that the driver himself specifies a certain comfort wish of the vehicle by activating a driving mode such as a so-called comfort mode by actuating an actuating element. It is further preferred that upon detecting such an activated comfort mode, the first damper default setting is set and the actuator is activated as well as the stabilizer assembly is operated with the second spring characteristic which is predetermined by the hydraulic damping of the actuator.

Furthermore, it is then preferably possible that the hydraulic damping with the adjusted first damper default setting (i.e. with the actuator activated) is performed by a frequency-selective valve depending on the oscillation frequency of the stabilizer halves. The actuating element or the valve is switched such that the fluid-conducting connection of the work chambers is established. The passage cross-section of the fluid-conducting connection is then adjusted by the frequency-selective valve depending on the frequency and without any external energy supply. In such a situation, the stabilizer assembly is operated on a mentioned variable spring characteristic or spring characteristic diagram. As seen from the point of view of damping capability, it is possible to operate the stabilizer assembly in a range between the first spring characteristic (i.e. with the valve fully open) and the second spring characteristic (i.e. with the valve fully closed) or at a value in between, depending on the oscillation frequency of the actuator or the stabilizer halves relative to each other.

By way of example, oil or hydraulic fluid can be used as the hydraulic medium or above-mentioned fluid with which the respective work chambers are filled.

In this way, a (for example switchable) stabilizer assembly can be advantageously provided which requires only little energy (or none) owing to a semi-active or, when using a frequency-selective valve, a passive embodiment, and can nevertheless be operated on at least two spring characteristics (or even on a characteristic diagram). Furthermore, in contrast to prior art, the transmission unit according to the invention allows a more variable and less limited volume flow of the hydraulic medium during hydraulic damping, thus optimizing the hydraulic damping. In addition, the stabilizer assembly according to the invention makes it possible to provide a sealing system that is optimized in terms of complexity and designing. Thus, instead of a complex sealing system as known from prior art, in this case only a conventional standard sealing system is required.

These and further features are apparent not only from the claims and the description, but also from the drawings, and the individual features can be realized in each case on their own or in several in the form of sub-combinations in an embodiment of the invention and can represent advantageous embodiments as well as embodiments capable of being protected on their own, for which protection is claimed here.

In the following, the invention will be further explained with the aid of two exemplary embodiments. All features described in more detail may be essential to the invention.

Figure 1:
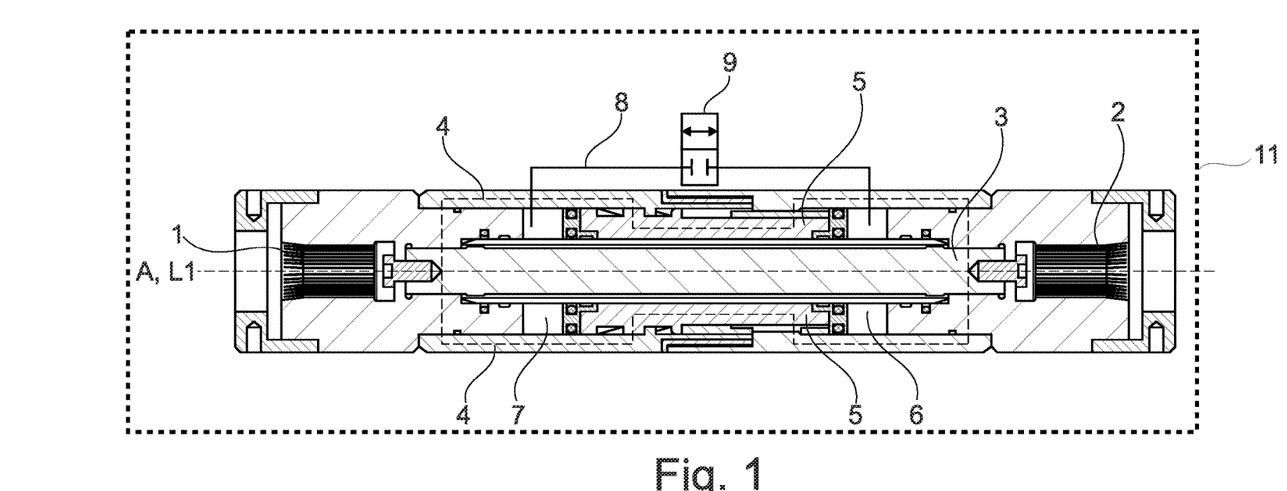
FIGS. 1 and 2 show a first exemplary embodiment of a stabilizer assembly, according to the invention, of a two-track vehicle in a sectional view through a longitudinal axis of the stabilizer assembly with an open position of a fluid-conducting connection and a closed position of this connection, respectively.
Figure 4:
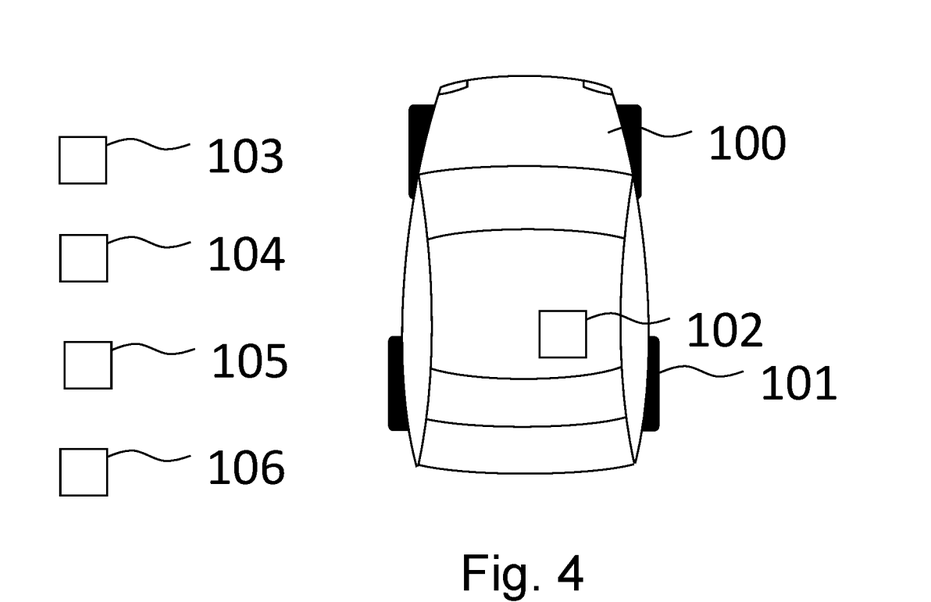
FIG. 4 schematically shows an exemplary two track vehicle 100 with wheel 101 and oscillation frequency sensor 102. Further schematically depicted are a first spring characteristic 103, a second spring characteristic 104, a damper default setting 105 and driving mode 106.
Figure 5:
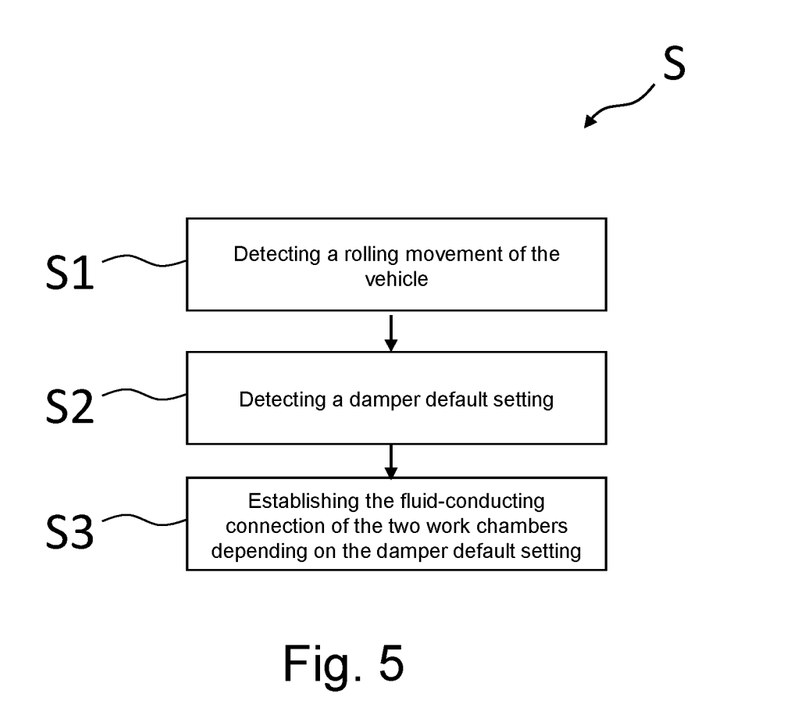
FIG. 5 schematically shows an example method S for operating a stabilizer assembly as described above with the steps of detecting, S1, a rolling movement of the vehicle; detecting, S2, a damper default setting; and subsequently establishing, S3, the fluid-conducting connection of the two work chambers depending on the damper default setting so that the rolling movement is damped by the hydraulic actuator.

FIG. 1 shows a first design in a sectional view through the longitudinal axis of the stabilizer assembly in a sectional view through the longitudinal axis of the stabilizer assembly of a two-track vehicle 100 (FIG. 4). Here, the stabilizer assembly comprises a stabilizer 11 comprising a first and a second stabilizer half 1, 2, each connected to a wheel 101 of the vehicle 100. The two stabilizer halves 1, 2 are coupled by means of a rubber rod 3, which is designed as a torsion bar spring, such that they can rotate relative to each other about their longitudinal axis A. During rolling movements of the vehicle 100, the two stabilizer halves 1, 2 rotate relative to each other, with the rolling movement being cushioned or damped by the rubber rod 3. The stabilizer assembly is operated on a first spring characteristic 103 by the rubber rod 3 depending on the spring stiffness of the rubber rod 3. Usually, the cushioning effect or the damping with such a torsion bar (also known as a passive stabilizer) as a spring element is comparatively low, i.e. the road feedback and thus also the rolling movements are damped less and are therefore more perceptible and more direct for a vehicle occupant (than is the case with an active stabilizer assembly).

Figure 3:
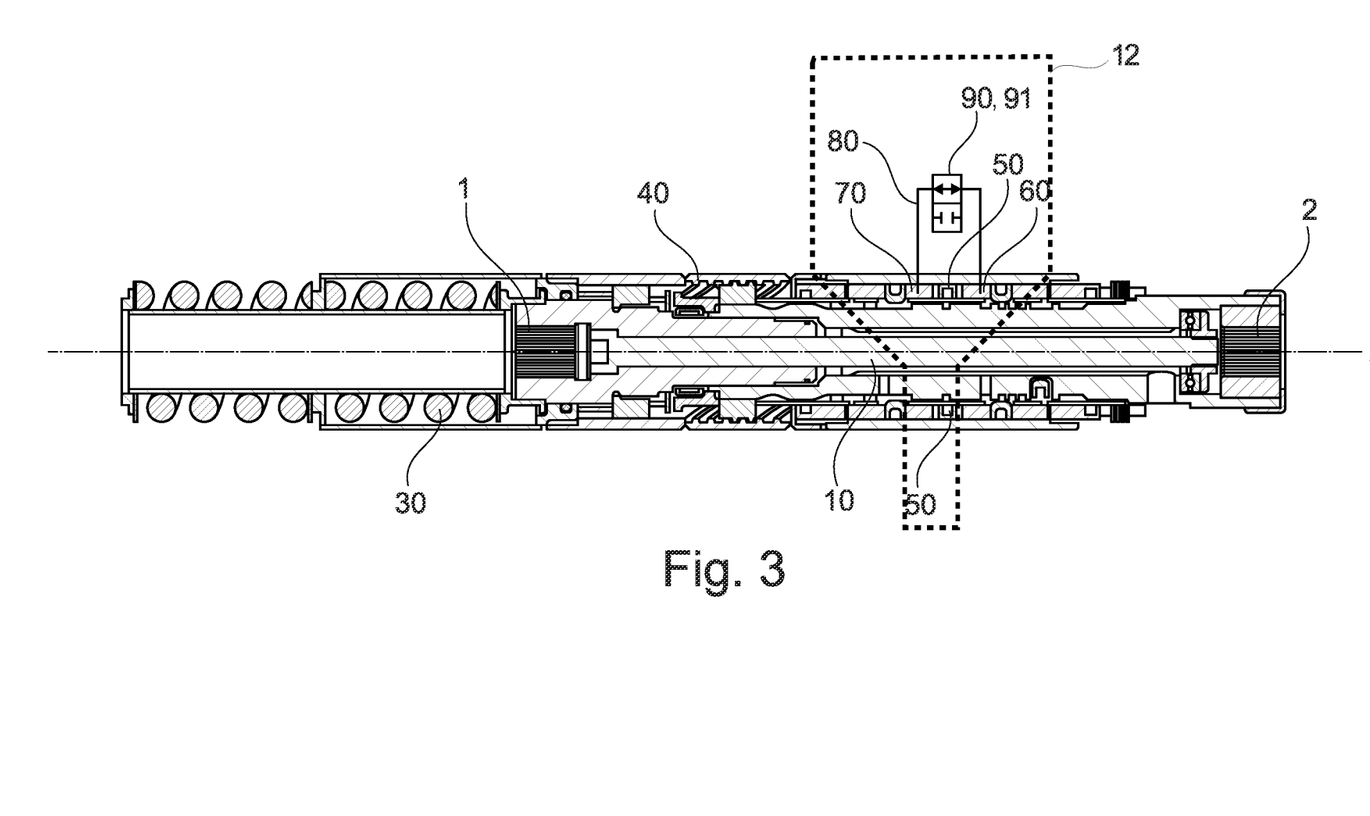
FIG. 3 shows a second exemplary embodiment of a stabilizer assembly according to the invention in a sectional view through the longitudinal axis of the stabilizer assembly.

It is further possible to couple the two stabilizer halves such that they can rotate relative to each other about their longitudinal axis A by means of a hydraulic actuator 12 (FIG. 3). This hydraulic actuator 12 is arranged between the two stabilizer halves 1, 2 and comprises a rotation-translation converter 4, which is coupled to each stabilizer half 1, 2 via an interlocking fit. The rotation-translation converter 4 converts the rotational movement (about the longitudinal axis A) of the stabilizer halves 1, 2 into a translational movement along the longitudinal axis A of an intermediate element 5 of the actuator. The intermediate element 5 is arranged between two work chambers 6, 7 which are filled with a hydraulic medium and coupled to each other by a fluid-conducting connection 8, and disconnects them from each other. The passage cross-section of the fluid-conducting connection 8 can be actively altered by means of a valve 9. By means of a control unit which is not depicted here, the valve 9 can be actively controlled, particularly in an open-loop or closed-loop manner. It is also provided that the control unit controls the actuator by closing or opening the valve 9, particularly in an open-loop or closed-loop manner. If the valve 9 is open, the actuator is activated and the stabilizer is operated on at least one second spring characteristic 104, which is determined by the hydraulic damping of the actuator. The second spring characteristic 104 has a higher damping level than the first load-deflection curve.

The maximum angle of rotation of the two stabilizer halves 6, 7 depends on the pitch of the gear teeth of the rotation-translation converter 4 and thus on the translational movability of the intermediate element 5. This translational movement of the intermediate element 5 and the associated compression of the hydraulic medium in the work chambers 6, 7 can be used to adjust the force-displacement characteristic or the spring rate of the stabilizer when the valve is open.

Since the valve 9 is closed in FIG. 1, there is no exchange of hydraulic medium between the two work chambers 6, 7. The two stabilizer halves 1, 2 are maximally coupled to each other and the stabilizer thus acts like a conventional torsion bar. It has the force-displacement characteristic of a conventional one-piece stabilizer, the spring rate of which is determined in this case by the rubber rod 3. The load curve of the stabilizer assembly with the valve 9 closed is shown in FIG. 1 by a dashed line L1.

Figure 2:
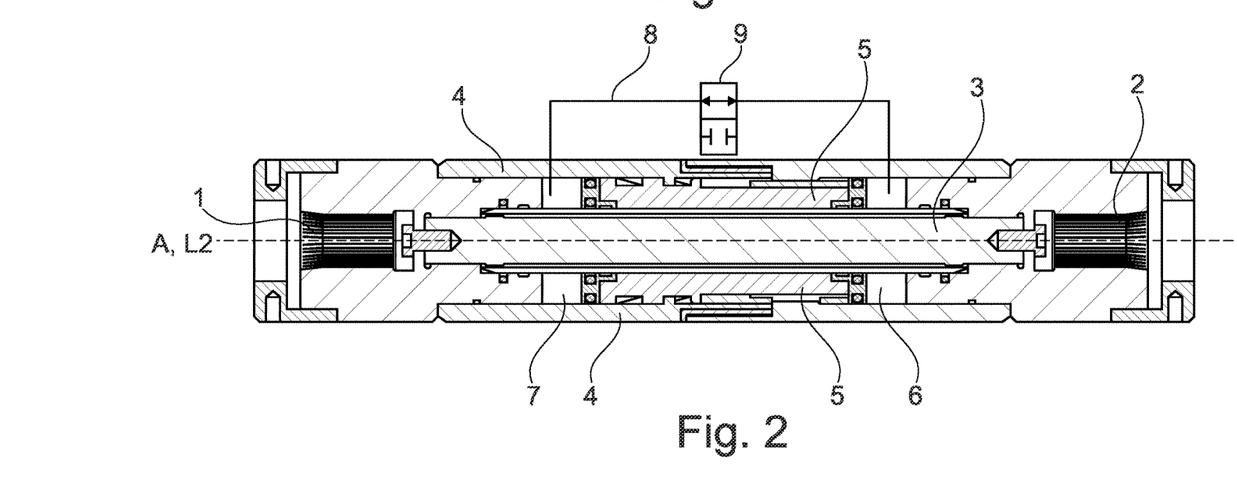

FIG. 2 shows the stabilizer assembly from FIG. 1, with the difference that the valve 9 is now shown in an open position. If the vehicle experiences a rolling movement, a hydraulic exchange takes place between the two work chambers 6, 7 through the fluid-conducting connection 8. Depending on the load, the one stabilizer half 1 is rotated relative to the other stabilizer half 2 due to the overflow of the hydraulic medium from one of the work chambers 6, 7 into the other. The degree of the prevailing torsional stiffness is determined by the pitch of the gear teeth of the rotation-translation converter 4 and the associated volume flow of the hydraulic medium flowing into the work chambers 6, 7. When the valve 9 is open, the stabilizer is thus set to be softer, i.e. the two stabilizer halves 1, 2 can rotate relative to each other more easily than in case the valve 9 is closed. For achieving the desired force-displacement characteristic of the stabilizer when the valve 9 is open, the geometry of the rotation-translation converter (in particular its gear teeth geometry) is designed accordingly.

The load curve or the flux of force through the stabilizer assembly with open valve 9 is shown in FIG. 2 by a dashed line L2.

As already mentioned in the description, instead of or in addition to the valve 9, a frequency-selective valve 91 (FIG. 3) can also be provided in the fluid-conducting connection 8, so that the damping is set depending on the oscillation frequency of the two stabilizer halves 6, 7.

If (only) a frequency-selective valve is used as an alternative to a valve 9 to alter the passage cross-section of the fluid-conducting connection 8, an active control or active activation or energization of the hydraulic actuator or the frequency-selective valve is not necessary. The hydraulic actuator then operates purely passively, i.e. without requiring external energy to actuate or operate the actuator. In this way, it is also possible to operate the stabilizer assembly on a variable spring characteristic or on a variable characteristic diagram without any external energy supply.

FIG. 3 shows a second design of a stabilizer assembly according to the invention. The difference between this and the first mentioned embodiment shown in FIGS. 1 and 2 lies in the geometrical configuration. However, the functional design is the same as in the first exemplary embodiment. The spring element in FIG. 3 is designed as a spiral spring 30, which is connected to a stabilizer half 1 in a rotationally fixed manner. The spiral spring 30 is arranged here such that its longitudinal axis or spring axis is parallel to the longitudinal axis A of the stabilizer assembly, or such that these are coincident. The two stabilizer halves 1, 2 are also connected to each other by a simple, rigid rod 10. The rod 10 is not designed as a spring element here.

In this case, too, the actuator comprises a rotation-translation converter 40 that converts the rotational movement of the stabilizer halves 1, 2 into a translational movement of an intermediate element 50 between two work chambers 60, 70. Also in this case, the two work chambers 60, 70 can be coupled to each other via a fluid-conducting connection 80. Here too, a valve 90 is arranged in the fluid-conducting connection 80, by means of which it is possible to switch the stabilizer assembly from the first spring characteristic to the second spring characteristic.

In the case of the valve 90 being closed, the spring force or damping of the stabilizer assembly is, in contrast to the first exemplary embodiment, predominantly dependent on the spring stiffness of the spiral spring 30. In the case of an open valve 90, the situation is the same as with the open valve 9 of the first embodiment.

Of course, it is also possible in this second embodiment to arrange a frequency-selective valve as an alternative or in addition to the valve 90 in order to ensure a variable spring characteristic.

It is also possible in both embodiments to provide a frequency-selective valve at the mentioned or another fluid-conducting connection 8, 80 of the stabilizer assembly, in addition to the valve 9, 90.

Furthermore, it is preferably provided in both exemplary embodiments that switching between the first and the second spring characteristic of the stabilizer assembly, i.e. the switching of the valve 9, 90, is dependent on external boundary conditions or on a set driving mode. More details on these boundary conditions are explained in the description above.

In this way, a switchable semi-active stabilizer assembly can be provided in a simple manner, in which neither an external pumping device nor a motor is required.

LIST OF REFERENCE SIGNS

1 stabilizer half
2 stabilizer half
3 rubber rod
4 rotation-translation converter
5 intermediate element
6 work chamber
7 work chamber
8 fluid-conducting connection
9 valve
10 rod
11 stabilizer
12 hydraulic actuator
91 frequency-selective valve
100 two-track vehicle
101 wheel
102 oscillation frequency sensor
103 first spring characteristic
104 second spring characteristic
105 damper default setting
106 driving mode
S method
S1-S3 method steps
30 spiral spring
40 rotation-translation converter
50 intermediate element
60 work chamber
70 work chamber
80 fluid-conducting connection
90 valve
A longitudinal axis
L1 flux of force
L2 flux of force

The invention claimed is:

1. A stabilizer assembly for a two-track vehicle for stabilizing a rolling movement, the stabilizer assembly being operable on at least two different spring characteristics, comprising:
   a stabilizer comprising a first and a second stabilizer half each coupleable to a wheel of the vehicle,
   wherein the first and the second stabilizer halves are coupled such that they are rotatable relative to each other about their longitudinal axis via a torsion bar spring formed as a rubber rod with no gear teeth connecting the two stabilizer halves, wherein the coupling to the torsion bar spring is characteristic for a first spring characteristic based on which the stabilizer assembly is operable, wherein the first spring characteristic is adjustable by the spring stiffness of the torsion bar spring, and wherein
   the first and the second stabilizer halves are hydraulically coupleable such that they are rotatable relative to each other about their longitudinal axis via a hydraulic actuator, whereby the stabilizer is operable with at least one second spring characteristic,
   the actuator comprising at least two work chambers which are filled with a hydraulic medium and coupled to each other by a fluid-conducting connection, wherein the actuator comprises a transmission unit which is configured to convert a rotational movement of the stabilizer halves into a translational movement of an intermediate element arranged between the two work chambers, and a volume flow of the hydraulic medium from the one work chamber into the other work chamber is thus producible, wherein the transmission unit comprises a rotation-translation converter coupled to the stabilizer halves, wherein the rotation-translation converter comprises gear teeth.

2. The stabilizer assembly according to claim 1, wherein the fluid-conducting connection of the work chambers comprises a frequency-selective valve configured to alter a passage cross-section of the fluid-conducting connection depending on the oscillation frequency of the stabilizer assembly and to operate the stabilizer on a variable spring characteristic.

3. The stabilizer assembly according to claim 1, wherein the hydraulic actuator comprises a valve for altering a passage cross-section of the fluid-conducting connection, the valve being configured to be selectively open, whereby the stabilizer is operable on the first spring characteristic; closed or partially closed, whereby the stabilizer is operable on at least two second spring characteristics.

4. The stabilizer assembly according to claim 3, wherein the valve is closed in an unpowered state.

5. A method for operating a stabilizer assembly of a two-track vehicle according to claim 1, proceeding in the following steps:
   detecting a rolling movement of the vehicle and
   detecting a damper default setting and subsequently
   establishing the fluid-conducting connection of the two work chambers depending on the damper default setting so that the rolling movement is damped by the hydraulic actuator.

6. The method according to claim 5, wherein the hydraulic damping is performed by a frequency-selective valve of the fluid-conducting connection depending on the oscillation frequency of the stabilizer halves and the stabilizer is operated on a variable spring characteristic.

7. The method according to claim 5, wherein the hydraulic actuator is deactivated upon detecting a second damper default setting, so that the fluid-conducting connection between the work chambers is interrupted and the rolling movement is supported by the spring.

8. The method according to claim 5, wherein the damper default setting is adjusted depending on a driving mode.

* * * * *